(12) United States Patent
Griffin et al.

(10) Patent No.: US 11,462,180 B1
(45) Date of Patent: Oct. 4, 2022

(54) MULTI-LAYERED DISPLAY APPARATUS HAVING A MESH LAYER WITH LIGHT EMITTING DIODES

(71) Applicant: THINKWELL GROUP, LLC, Los Angeles, CA (US)

(72) Inventors: Jon Paul Griffin, Fullerton, CA (US); William Le Dang, Los Angeles, CA (US); Michael Andrew Carpenter, Santa Monica, CA (US); Thomas Jakobsen, Altadena, CA (US)

(73) Assignee: Thinkwell Group, LLC, Los Angeles, CA (US)

( * ) Notice: Subject to any disclaimer, the term of this patent is extended or adjusted under 35 U.S.C. 154(b) by 0 days.

(21) Appl. No.: 17/125,867

(22) Filed: Dec. 17, 2020

Related U.S. Application Data

(60) Provisional application No. 62/950,889, filed on Dec. 19, 2019.

(51) Int. Cl.
| | |
|---|---|
| *G09G 3/34* | (2006.01) |
| *G09G 3/32* | (2016.01) |
| *G03B 21/60* | (2014.01) |
| *H04N 9/31* | (2006.01) |

(52) U.S. Cl.
CPC ............ *G09G 3/342* (2013.01); *G03B 21/60* (2013.01); *G09G 3/32* (2013.01); *H04N 9/3108* (2013.01); *H04N 9/3155* (2013.01); *H04N 9/3164* (2013.01)

(58) Field of Classification Search
CPC ....................................................... G09G 3/342
USPC ............................................................ 345/204
See application file for complete search history.

(56) References Cited

U.S. PATENT DOCUMENTS

| | | | | |
|---|---|---|---|---|
| 6,809,792 B1* | 10/2004 | Tehranchi | ............. | G03B 21/32 348/E5.137 |
| 9,422,736 B2 | 8/2016 | Fox | | |
| 2005/0018141 A1* | 1/2005 | Hosaka | .................. | H04N 9/315 353/31 |
| 2006/0193042 A1* | 8/2006 | Karlsen | .................. | G03B 21/62 359/443 |
| 2015/0111654 A1* | 4/2015 | Fox | ........................ | H04R 27/00 472/75 |

* cited by examiner

*Primary Examiner* — Long D Pham
(74) *Attorney, Agent, or Firm* — Saxton & Stump, LLC

(57) ABSTRACT

In various embodiments, a system includes a mesh layer including a plurality of LEDs, where at least a subset of the LEDs is selectively controllable to control lighting of the mesh layer. The system further includes a screen layer at least partially aligned with the mesh layer, wherein the screen layer is configured to: be illuminated from behind by the mesh layer, and at least partially absorb light projected onto the screen layer.

32 Claims, 6 Drawing Sheets

… (1)

MULTI-LAYERED DISPLAY APPARATUS HAVING A MESH LAYER WITH LIGHT EMITTING DIODES

CROSS REFERENCE TO OTHER APPLICATIONS

This application claims priority to U.S. Provisional Patent Application No. 62/950,889 entitled LIVING MURAL filed Dec. 19, 2019 which is incorporated herein by reference for all purposes.

BACKGROUND OF THE INVENTION

The human eye can easily differentiate between images applied on traditional substrates (e.g., paper, canvas, panels, or the like) and digital images, which are images projected onto a plain wall or screen or displayed on an electronic display screen. Images embodied by analog art forms such as traditional fine art are often described as organic, natural, or realistic looking while digital images may be perceived to be too bright, unnatural, or unrealistic. It is challenging to make digital images look like traditional images because humans are very sensitive to variations in brightness and colors both within a digital display and also in relation to the ambient environment of the image. Digital images are typically rendered either by a projection or raster-based display device that refreshes periodically. Factors such as the refresh rate, bulb and lens properties in projectors, and manufacturing variations in raster-based displays cause digital images to look different from traditional images.

Current electronic display technologies include LED/LCD (light emitting diode-liquid crystal display), OLED (organic light emitting diode), and QLED (quantum dot light emitting diode), which offer enhanced color, contrast, and resolution compared with older electronic displays. However, such display devices do not scale well because it is prohibitively expensive to produce large displays using these conventional technologies. Large format displays are typically made up of several LED panels. Even with careful calibration, the manufacturing process typically produces panels with different colors and brightness levels. Thus there is a need for improved electronic displays that look more like traditional images.

BRIEF DESCRIPTION OF THE DRAWINGS

Various embodiments of the invention are disclosed in the following detailed description and the accompanying drawings.

DETAILED DESCRIPTION

Figure 1:
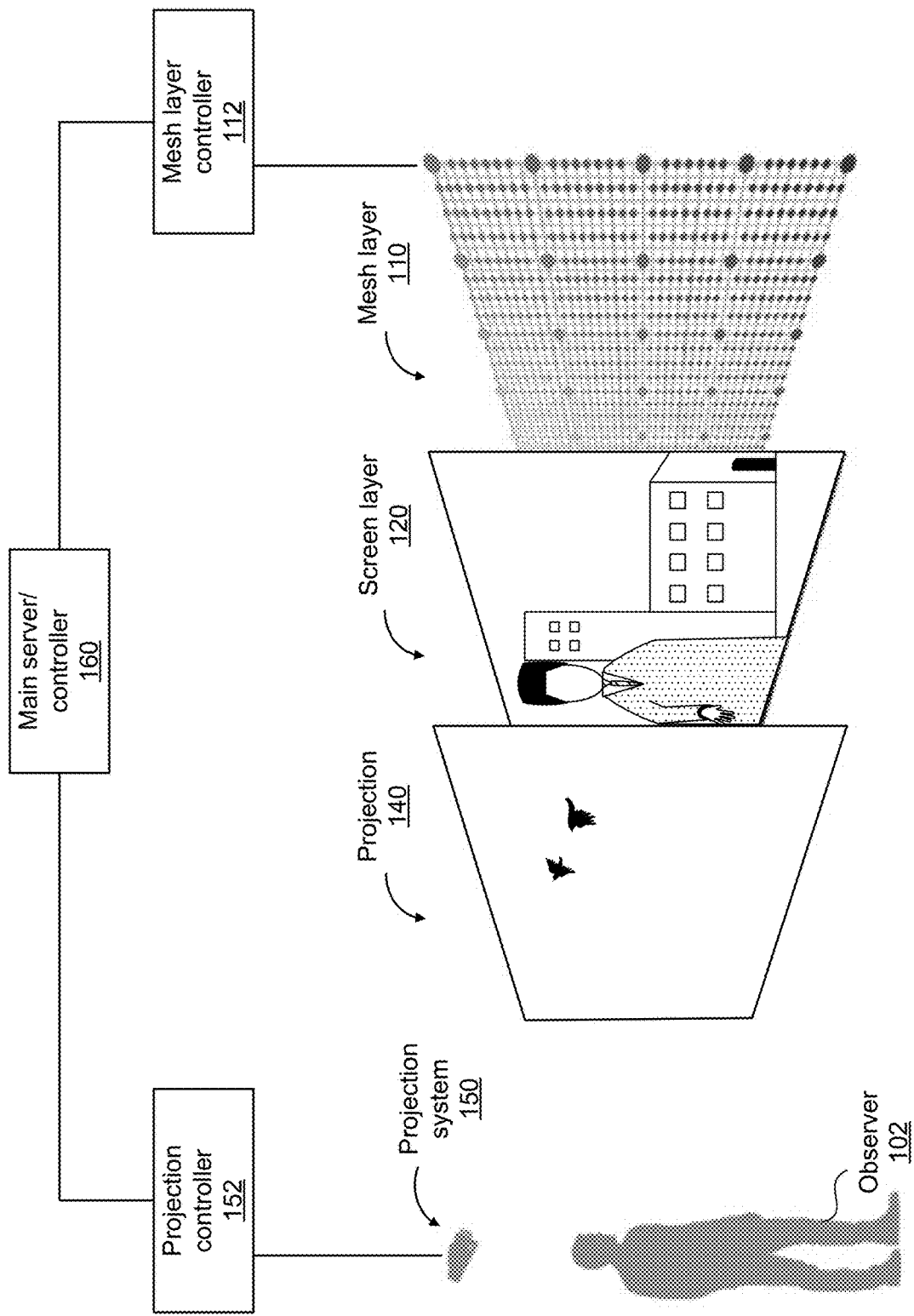
FIG. 1 is a block diagram illustrating an embodiment of a multi-layered display apparatus (system).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a multi-layered display apparatus are disclosed. The disclosed multi-layered display apparatus provides a customizable and scalable electronic display installation without the expense and resources required of large format LED display systems. The disclosed techniques create a composite image (still or animated) that, like a traditional image, is organic, natural, and realistic. The disclosed techniques find application in producing art-quality pieces. In various embodiments, the multi-layered display apparatus includes one or more large-format graphic panels printed via inkjet or dye sublimation methods to create an impactful and life-like art piece through lighting and projection effects as further described herein. The large-format graphic panel may be one that is commercially available. One of the benefits of the disclosed techniques is the scalability. As such, the display apparatus is sometimes referred to as a "living mural" because the display can be both large and life-like. The mural is called a living mural because dynamic media can be displayed on the mural. Although the mural can be a large size, it is energy efficient while being comfortable for an observer to view in a variety of lighting conditions.

The multi-layered display apparatus is a unique combination of printed graphics, technologies, techniques, programming, and media to create a desired effect. The end result is a composite image that can be animated in a wide variety of ways utilizing the unique combination of elements. The display apparatus finds application in a variety of settings including amusement park rides or waiting areas, theater props, advertisements, etc.

In various embodiments, the multi-layered display apparatus is adapted to display changing environments. The combination of a flexible LED-node mesh mounted behind a custom-printed fabric in conjunction with a front projection allows for controlled environmental changes and visible animated moments, which interact elements/characters and scenery on the display. The images including the examples shown in the figures depict various characters and visual elements, but this is merely exemplary and not intended to be limiting. The techniques can be applied to render any image including visual elements such as distinguishable characters or objects paired with background imagery.

In an embodiment, the display apparatus (more generally referred to as a "system") includes a mesh layer and a screen layer that is at least partially aligned with the mesh layer. The mesh layer includes a plurality of light emitting diodes (LEDs). One or more subsets of the LEDs is selectively controllable to control lighting of the mesh layer. The screen layer is configured to be illuminated from behind by the mesh layer and at least partially absorbs light projected onto the screen layer.

FIG. 1 is a block diagram illustrating an embodiment of a multi-layered display apparatus (system). The system includes a mesh layer 110 and a screen layer 120.

Mesh layer 110 is configured to provide backlight and/or programming to create the illusion of motion. The mesh layer 110 is a system of lights that provides ample illumination with appropriate node density and size to provide control of back-light elements and areas. One or more regions of the mesh layer can be illuminated at various light intensities and/or colors. In various embodiments, the mesh layer includes a plurality of LEDs connected together to form a mesh. Each LED or group of LEDs is referred to as a node in the mesh. The resolution of the mesh layer is determined by the number of LEDs and/or spacing between LEDs.

In various embodiments, the mesh layer is a low resolution mesh. A low resolution mesh is typically less expensive because fewer LEDs are used compared to a higher resolution mesh while still providing ample backlighting for the screen layer. When coupled with the front projection, the low resolution mesh provides a realistic and natural viewing experience. In various embodiments, a low resolution mesh is any mesh with spacing that is 4 inches or more between nodes. Some of the advantage of using a low resolution mesh include reduced power consumption and heat load compared with higher resolution options, while still delivering the color and intensity for an effective display apparatus. The mesh layer can be designed using a desired node density depending on application. A display apparatus expected to be viewed from afar can have a lower resolution than a display apparatus expected to be viewed up close. For example, 4 to 6 inches spacing between nodes (as determined by an intensity needed for a particular application) is suitable for a large mural.

By way of non-limiting example, the following LED systems may be used in the mesh layer 110:
FlexiFlex® or FlexiFleXL lights made by RGB Lights.
Philips Color Kinetics
VC-Grid60 by Martin Lighting Screen layer 120 is configured to be illuminated from behind by the mesh layer 110 and/or receive a projection 140 from the front. In various embodiments, the screen layer is made of a material such as a fabric that can be stretched on a frame to create a wrinkle-free at least semi-translucent surface permitting backlighting to show with showing the mesh layer structure. The screen layer material is scalable, e.g., from sizes as small as 2 feet by 2 feet, to as large as 16 feet by 160 feet with no noticeable seams or gaps. When used in conjunction with the mesh layer, the screen layer retains its saturated colors and print details, but does not allow the observer to see through the material to the space behind it in various embodiments. The screen layer can be made from a printable material so that graphics, text, or other visual components are printed on the screen layer as further described herein.

Any suitable flexible material can be used. By way of non-limiting example, the following are some suitable materials:
  Supernova polyester knit made by Aurich Textiles GmbH
  Glow or Samba fabric by AAA Flag and Banner Mfg. Co.®
  6 oz Poplin, 9 oz Poplin, 9 oz Poplin Backlit IFR, Aglo, or Broadway Soft 16 ft by Rose Brand®
  Samba 631 by SewWhat? Inc.
  The following fabrics by Big Image Systems®
    Samba 631
    Samba 631 Backlight
    Terra Light 200
    Terra Light 200 Backlight
    Super Canvas CS
    Muslin CS
    Heavy Canvas CS
    Taffeta
    Cotton Muslin Translight
    Cloth 201 HzN
    Rolltex Medium 246
    Lunar Spot
  Vinyl or poplin by Warner Bros. Design Studios®
  Microlux Soft by Georg+Otto Friedrich GmbH
  The following fabrics by Aurora Textiles Group, Inc.
    Senfa/Decoprint
    Decoprint Pearl
    Matte Canvas
    Satin Canvas
    Semi-Gloss Canvas
    Triple White FR Projection system 150 is configured to project media elements such as projection 140 onto screen layer 120. For example, custom-created media elements can be projected to enhance the display with motion elements. In various embodiments, the projector 150 is mounted in front of the screen layer as shown.

The projection system 150 includes one or more projection devices mounted in one or more locations. For simplicity, a single projector is shown. Any projection system that allows for fine control of the projected elements may be used. In various embodiments, the projection system is calibrated based on the expected quality of light in the space in which the display apparatus is installed. For example, for a space that is lit naturally, the projection system provides significant output to combat direct sunlight, but not reflect off the screen layer material to create glare, while maintaining a level that makes the projected imagery look as if it is part of the mural itself.

An example of a projection system is the Pro L1755UNL projector made by Epson®. A lens such as the ULPLX02 Ultra Short Throw Lens can be installed on the projector. Whether a lens and the type of lens used depends on the particular environment of the display apparatus. For example, the short throw lens is suitable for displaying large images from a short distance such as displaying a large mural in a relatively shallow entry hall.

The mesh layer 110 and screen layer 120 are layered to create a desired effect such as a composite image that dynamically changes over time. For example, the mesh layer and the screen layer are arranged so that they (at least partially) align with each other. In various embodiments, the screen layer is installed four inches away from the mesh layer mounting surface. In various embodiments, the distance of the installation (four inches) works well because it allows ample light-output while preventing an observer from seeing the individual nodes of the mesh layer. In some tests, if the mural is closer than four inches, then the individual nodes are visible. If the mural is farther than four inches, some intensity was lost and the lights would spread or bleed into other areas of the mural. The four inch spacing was determined to be a good balance between providing the smoothest light-output along with the highest intensity, while not showing the individual nodes of the mesh layer.

In various embodiments, the system further includes one or more controllers configured to control lighting of the mesh layer 110 and/or projections 140 that get projected onto the screen layer 120. In this example, the controllers include a main server/controller 160, a mesh layer controller 112, and a projection controller 152. One or more of the controllers may be implemented by the system shown in FIG. 6.

Main server/controller 160 is configured to create a composite image by coordinating output of projection 140 onto screen layer 120 with illumination of LEDs in the mesh layer 110. In various embodiments, the main controller provides dynamic and selective control of LEDs included in the mesh layer and provides a front projection. The main server/controller may be embodied in an integrated device or the server functionality and controller functionality may be embodied in separate/several devices. To more clearly describe the different controls, projection controller 152 is described to control projection system 150 to output the projection 140 while mesh layer controller 112 is described to control the mesh layer 110. However, these functionalities can be embodied in one or more physical devices. For example, a single controller can be responsible for controlling both projection 140 and the mesh layer 110. In such a system, a single controller would replace main server/controller 160, projection controller 152, and mesh layer controller 112. Controllers may be communicatively to the projector 150, mesh layer 110, and/or each other via a wired connection or a wireless connection/network.

An example of a main controller is GrandMa2 by MA Lightingx. An example of a main server is a Green Hippo® media server. For example, video content is fed to mesh layer 110 and projector 150 via a Green Hippo® media server controlled by a MA Lighting® show control console. Protocols such as digital multiplex (DMX) can be used to control lighting and effects. Example of standard protocols include Artnet, KiNET, and sACN. The protocol is used for the multiple universes of control required for the various layers and mixes from the media server. In various embodiments, capture interface transport protocol (CITP) feedback from the media server can be used to get direct video feedback from the media server to the lighting console for monitoring purposes. The feedback to the lighting console allows a content programmer to see the video output from the media server without needing a second video monitor from the media server.

Figure 2A:
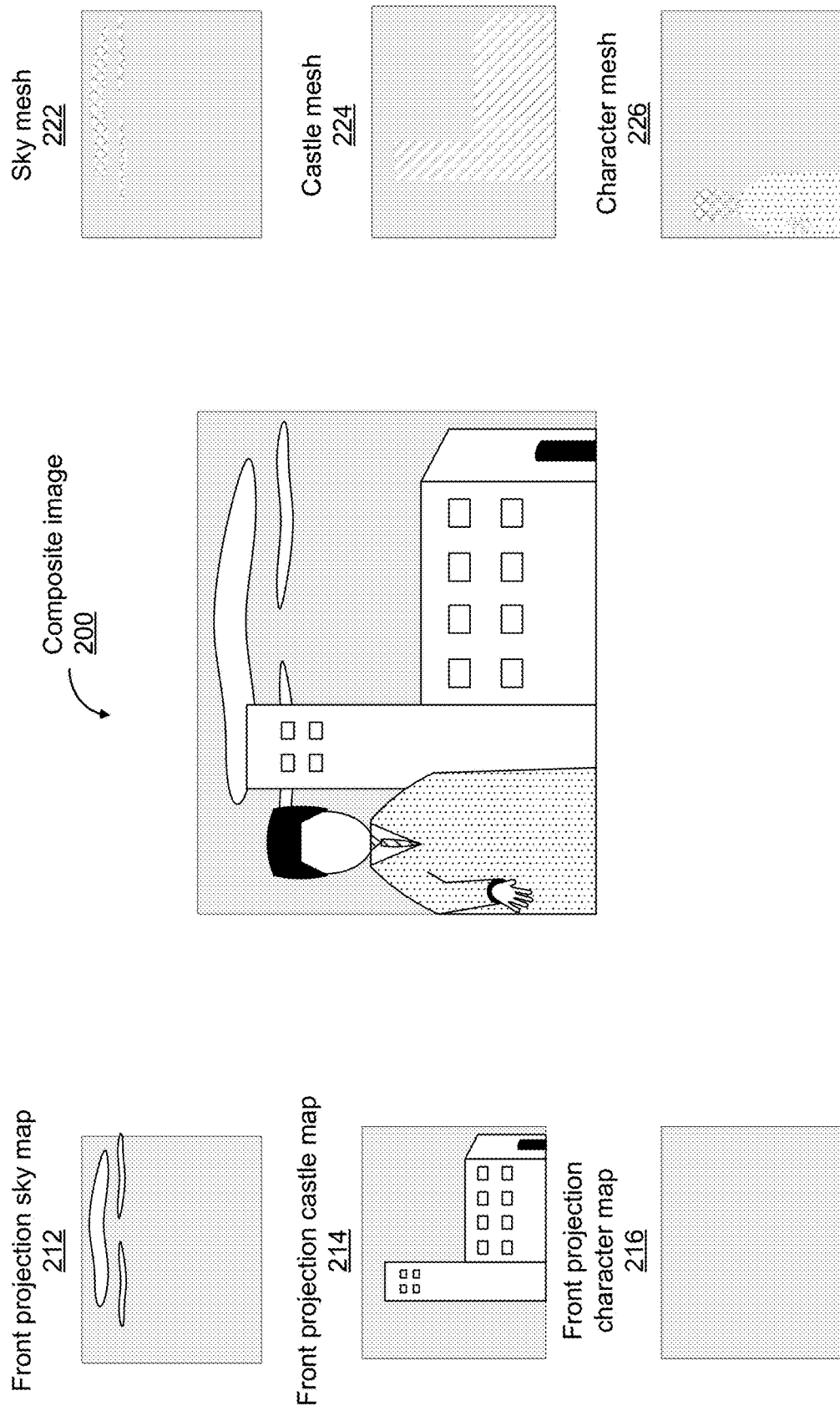
FIG. 2A illustrates an example of a first composite image comprising various layers obtained in some embodiments.
Figure 2B:
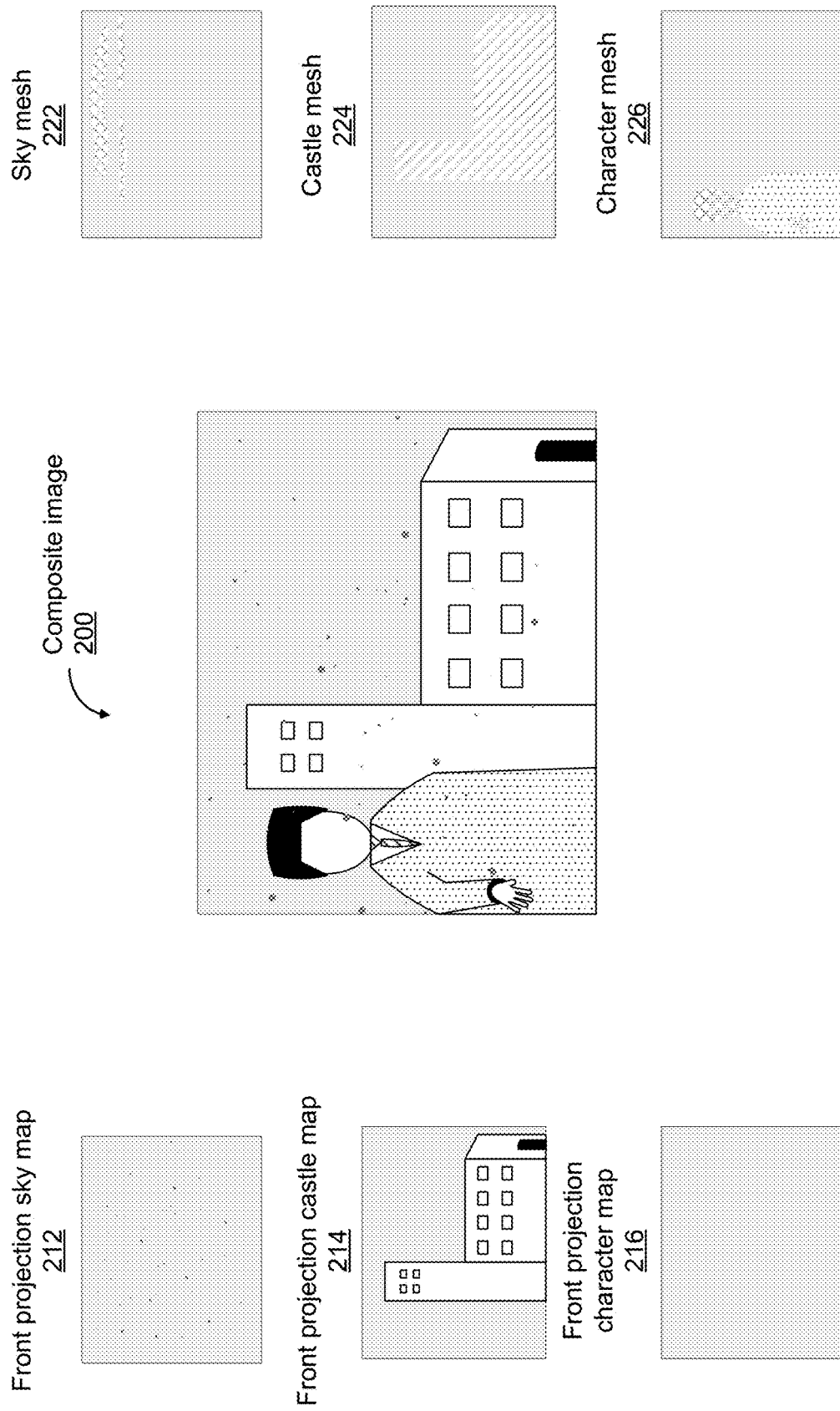
FIG. 2B illustrates an example of a second composite image comprising various layers obtained in some embodiments.

In operation, the main server/controller 160 is set up with multiple mixes to provide control of the projection system 150 and the mesh layer 110 of the display apparatus. The main server/controller 160 sends video (e.g., HDMI or any other protocol) to the projection system 150 and separately sends corresponding lighting instructions to the mesh layer 110. For example, the set up includes at least one video mix for the projection system 150 and four layers with each layer assigned to its own mask (e.g., character, scenic item, and sky), providing four total mixes and sixteen layers of video. Some examples of the layers are shown in FIGS. 2A and 2B.

The main server/controller 160 sends an appropriate number of universes to the mesh layer 110 depending on the network protocol and LED mesh. For example, the protocol Ki-Net requires one universe per strand of FlexiFleXL so 48 universes are sent to Ki-Net. The creation of pixel accurate video maps within the media server allows precise control of which elements go to each part of the video mesh.

The projection 140 corresponds to the lighting of the mesh layer 110 so that a composite image is formed. An example of an observer 102 is also pictured to show how an audience member may view the composite image generated by the display apparatus. The observer 102 positioned in front of the screen layer 120 would observe the composite image created by the aligned screen layer and mesh layer. The viewing experience is similar whether the observer is positioned at the center of the screen layer or off to the sides. For example, several viewers may stand in various places in the waiting area of an amusement park ride. Some viewers are near the center, while others may be standing or sitting off to the left side or right side. Nonetheless, each viewer will have a similar experience watching the composite image dynamically change to tell a story.

There are no restrictions on the size of the display apparatus. In an exemplary embodiment, the display apparatus is 135 feet long and can follow the shape of the room, for example wrapping around a lobby area.

The display apparatus can display a variety of media. For example, with moving video backlighting and front mapped projected imagery, the living mural is slowly transformed with an ambient and atmospheric series of images (frames) that reflect motifs and events. The series of frames can be of a pre-defined durations such as 35 minutes.

FIG. 2A illustrates an example of a first composite image comprising various layers obtained in some embodiments. When setting up the mix video for the projection system 150, color corrections can be made to provide a desired visual effect. For example, multiple layers of video can be used to test various scenarios and to find the proper color corrections needed for the elements. Based on the color corrections, the proper shading is selected for the video mesh to provide the most visual depth to the graphic from the various viewing distances.

Multiple video layers that tie the graphic and motion into a cohesive storyline can thus be formulated to create a multiple scene loop complete with atmospheric changes, effects, and shading. A user observes the composite image obtained by controlling the mesh layer and projection onto the screen layer. Various moods can be conveyed by the composite image. FIGS. 2A and 2B show some examples.

For generality, the facial features of the character in the composite image and the other figures are not shown. Any image including images of characters with detailed facial features may instead be used. Composite image 200 is formed by projections 212, 214, and 216, a screen layer (not shown), and illuminations 222, 224, and 226 of a mesh layer. As shown, the overall effect is of a character with a castle in the background.

Projections 212, 214, and 216 are three layers that can be combined to form a projection output by a projection system such as 150 of FIG. 1. In this example, one layer of the projection is a sky map 212, another layer of the projection is a castle map 214, and a third layer of the projection is the character map 216. Illuminations 222, 224, and 226 of mesh layer show an example of the brightness and colors of the LED mesh. Compared with the projection, the illuminations for the mesh layer are lower resolution but the backlighting helps to make the composite image more life-like.

The sky map 212 shows the images (colors and lighting) that, when coupled with sky mesh 222, makes the sky look the way it does in composite image 200. For example, details of the clouds come from sky map 212 while the stormy mood comes from sky mesh 222. Similarly, the castle map 214 includes architectural details and illuminated windows while the castle mesh provides overall coloring and shadowing for the castle. In various embodiments, screen layer includes cutouts. The cutouts are areas of reduced/more thickness or different material. For example, the windows of the castle are cutouts to further enhance the illumination of the windows by permitting the projection and/or backlighting from the mesh layer to show more prominently.

The character map 216 appears to be blank in this example because the effect of the character here is formed by the screen layer, which has the character printed on it, and the character mesh 226. As shown, the character mesh 226 provides lighting and coloring of the facial and torso regions of the characters. In other words, the brightness and color of the mesh layer forms an image. This causes the associated regions of the screen layer to be back-lit, making the character look more natural.

FIG. 2B illustrates an example of a second composite image comprising various layers obtained in some embodiments. Each of the components are like their counterparts in FIG. 2A unless otherwise described. In this example, the composite image shows a snowy scene. Snowflakes can be rendered using front projection sky map 212, while sky mesh 222 is more blue/grey to create a wintery atmosphere. Although not shown, the projection can also produce other effects such as snowflakes reflected in the glasses of the character. It is now daytime, so the front projection castle map 214 does not have illuminated windows. The daytime effect is also provided by the castle mesh 224. The character mesh 226 illuminates the character region without differing colors in the face vs. the body.

The mood of a scene can be altered by changing one or more of the projections 212-216 or mesh lighting 222-226. For example, a more ominous mood can be conveyed by making the sky darker (reducing lighting) or changing the color (making it greener). The effect can be created by sky map 212 (more teal and green tones) and sky mesh 222. The effect is also heightened by changing the shadows and lighting of the castle using castle map 214 and mesh 224. The realistic effect of the changing light on the character is implemented by character mesh 226, which dims the brightness of the backlighting.

The composite image appears to be dynamic, and the dynamic effect is created by projecting an image and backlighting a static screen layer. The following figures show a screen layer in various states.

Figure 3:
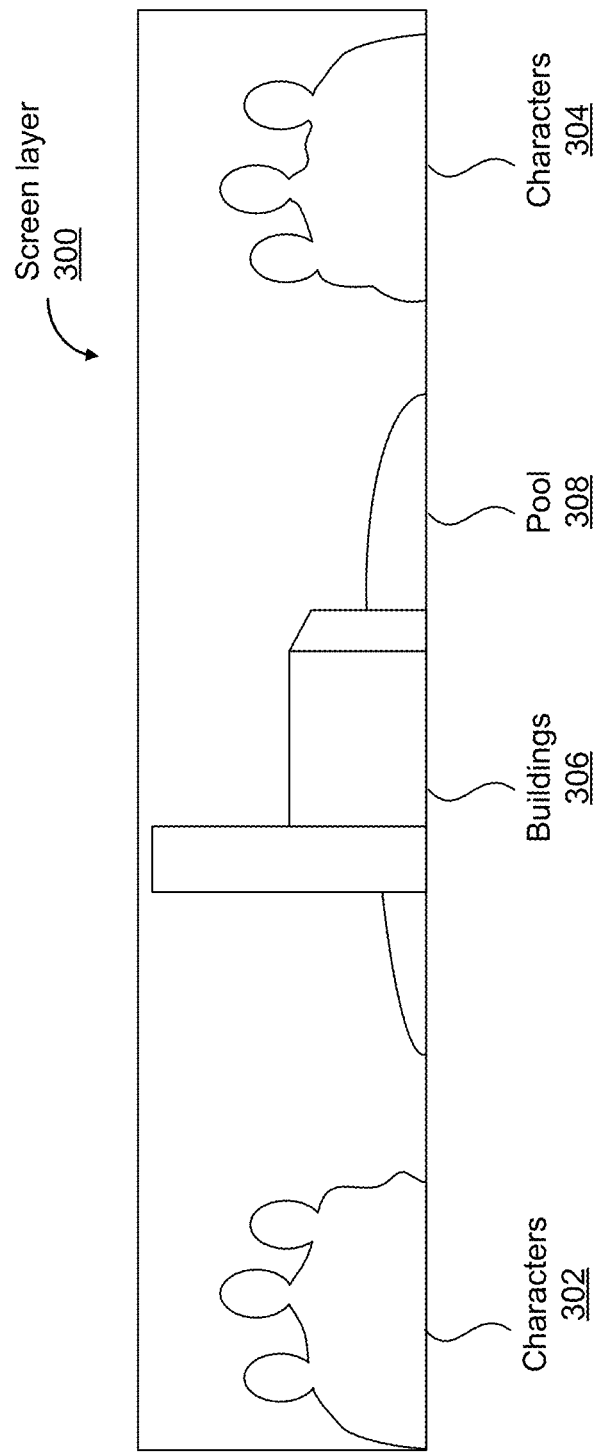
FIG. 3 illustrates an example of a screen layer.

FIG. 3 illustrates an example of a screen layer. The major elements in the screen layer 300 are printed onto the screen layer. In this example, the three characters 302 to the left, buildings 306, pool 308 surrounding the building, and three characters 304 to the right are printed onto the screen layer. The facial features (although not shown here) can also be printed.

Various moods and events can be created by projecting onto this screen layer and/or illuminating a mesh layer behind this screen layer. For example, an event causes a lamp in front of one of the characters to be illuminated along with ripples in the sky. An illuminated lamp, ripples, color of sky, and bright spot behind the buildings can be created by a front projection onto the screen layer. Composite images can be created based on the same static screen layer, and yet have very different moods and effects because of the combination of a front projection with backlighting from a mesh layer. Since the screen layer can be flexible, the image can be curved, for example following the contours of an entrance hall.

Figure 4:
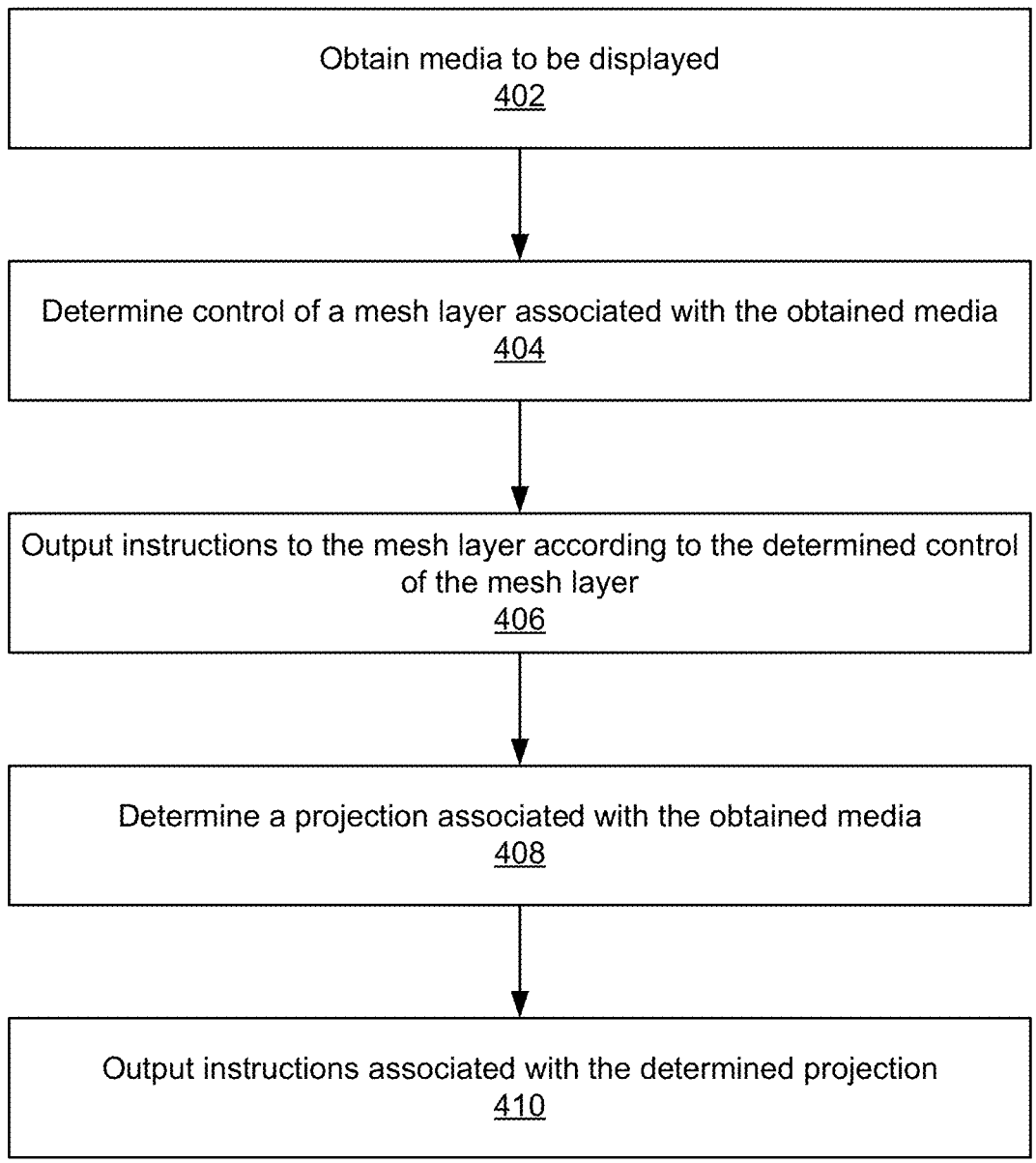
FIG. 4 is a flow diagram illustrating an embodiment of a process for producing a composite image for a multi-layered display apparatus.

FIG. 4 is a flow diagram illustrating an embodiment of a process for producing a composite image for a multi-layered display apparatus. The process can be performed by one or more of the controllers 112, 152, and 160 of FIG. 1 or by the processor shown in FIG. 5.

The process begins by obtaining media to be displayed (402). The media can be locally and/or remotely stored. The media can correspond to a single image or a sequence of images.

The process determines control of a mesh layer associated with the obtained media (404). The mesh layer includes a plurality of LEDs and at least a subset of the LEDs is selectively controllable to control lighting of the mesh layer. An example of the mesh layer is the one shown in FIG. 1. Referring to FIG. 2A, control of a mesh layer includes instructions to illuminate the mesh layer to produce the mesh 222, 224, and 226. The control of the mesh layer can be predetermined, e.g., a sub-file in the obtained media, or can be dynamically determined upon retrieval of the media.

The process outputs instructions to the mesh layer according to the determined control of the mesh layer (406). The instructions cause the mesh layer to be illuminated with a certain brightness or color in various regions to produce meshes like those shown in FIGS. 2A and 2B for example.

As described with respect to FIG. 1, the process sends an appropriate number of universes to the mesh layer 110 depending on the network protocol and LED mesh. For example, the protocol Ki-Net requires one universe per strand of FlexiFleXL so 48 universes are sent to Ki-Net. The creation of pixel accurate video maps within the media server allows precise control of which elements go to each part of the mesh layer.

The process determines a projection associated with the obtained media (408). The projection can be a single image or a sequence of images (video). Referring to FIG. 2A, projections include 212, 214, and 216. The projection can be predetermined, e.g., a sub-file in the obtained media, or can be dynamically determined upon retrieval of the media. As described with respect to FIG. 1, the projection may include several layers with each layer assigned to its own mask (e.g., character, scenic item, and sky). Some examples of the layers are shown in FIGS. 2A and 2B.

The process outputs instructions associated with the determined projection (410). The instructions cause a projection to be output to a screen layer at least partially aligned with the mesh layer, the screen layer being configured to be illuminated from behind by the mesh layer, and at least partially absorb light projected onto the screen layer. An example of the screen layer is the one shown in FIG. 1. For example, a projection system is instructed to output the projections.

The process may coordinate timing of outputting instructions to the mesh layer (406) and outputting instructions associated with a projection (410) so that a composite image or sequence of images is formed.

Figure 5:
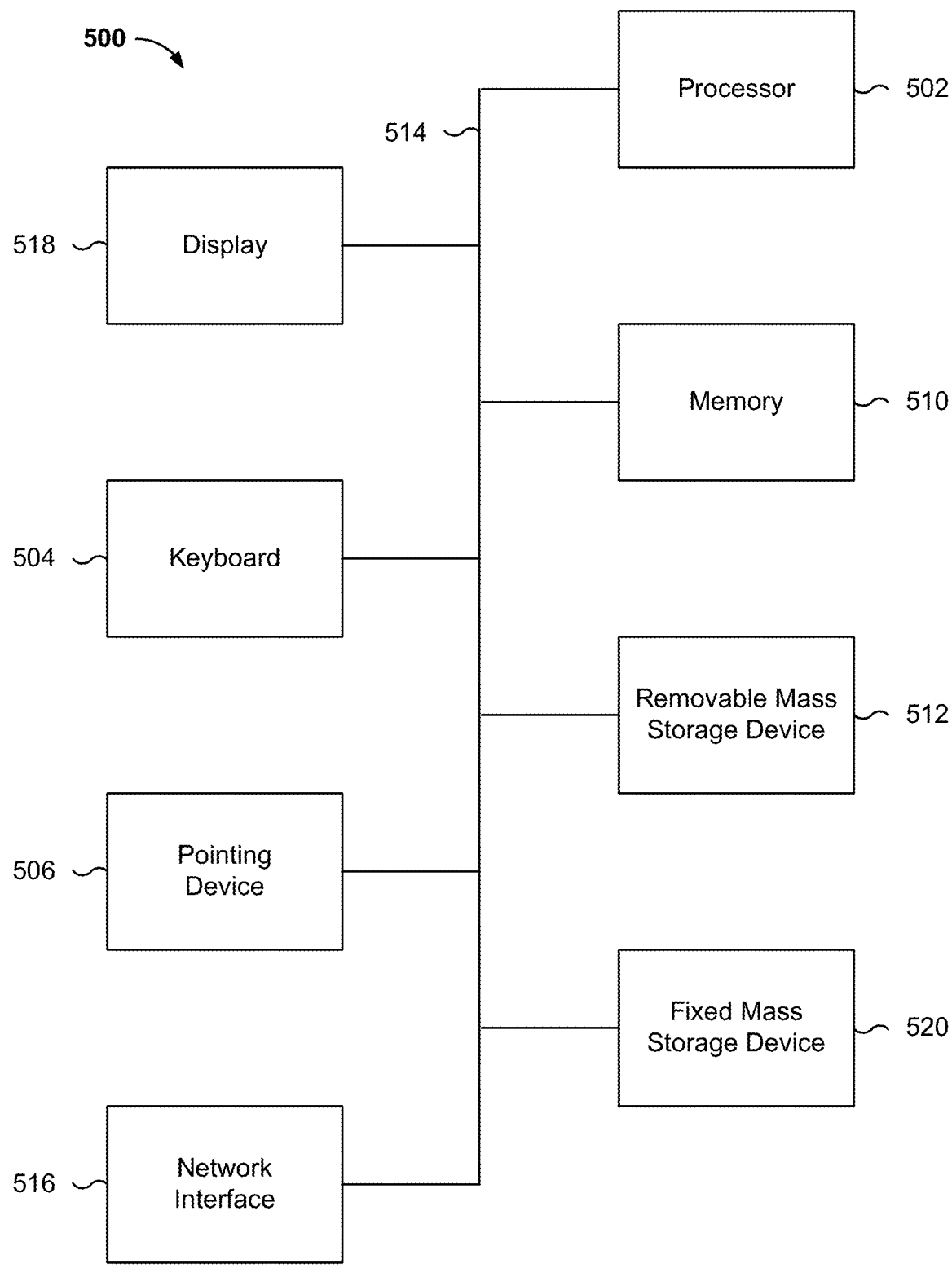
FIG. 5 is a functional diagram illustrating a programmed computer system for a multi-layered display apparatus in accordance with some embodiments.

FIG. 5 is a functional diagram illustrating a programmed computer system for a multi-layered display apparatus in accordance with some embodiments. As will be apparent, other computer system architectures and configurations can be used to perform the described image compositing technique. Computer system 500, which includes various subsystems as described below, includes at least one microprocessor subsystem (also referred to as a processor or a central processing unit (CPU) 502). For example, processor 502 can be implemented by a single-chip processor or by multiple processors. In some embodiments, processor 502 is a general purpose digital processor that controls the operation of the computer system 500. In some embodiments, processor 502 also includes one or more coprocessors or special purpose processors (e.g., a graphics processor, a network processor, etc.). Using instructions retrieved from memory 510, processor 502 controls the reception and manipulation of input data received on an input device (e.g., image processing device 506, I/O device interface 504), and the output and display of data on output devices (e.g., display 518).

Processor 502 is coupled bi-directionally with memory 510, which can include, for example, one or more random access memories (RAM) and/or one or more read-only memories (ROM). As is well known in the art, memory 510 can be used as a general storage area, a temporary (e.g., scratch pad) memory, and/or a cache memory. Memory 510 can also be used to store input data and processed data, as well as to store programming instructions and data, in the form of data objects and text objects, in addition to other data and instructions for processes operating on processor 502. Also as is well known in the art, memory 510 typically includes basic operating instructions, program code, data, and objects used by the processor 502 to perform its functions (e.g., programmed instructions). For example, memory 510 can include any suitable computer readable storage media described below, depending on whether, for example, data access needs to be bi-directional or uni-directional. For example, processor 502 can also directly and very rapidly retrieve and store frequently needed data in a cache memory included in memory 510.

A removable mass storage device 512 provides additional data storage capacity for the computer system 500, and is optionally coupled either bi-directionally (read/write) or uni-directionally (read only) to processor 502. A fixed mass storage 520 can also, for example, provide additional data storage capacity. For example, storage devices 512 and/or 520 can include computer readable media such as magnetic tape, flash memory, PC-CARDS, portable mass storage devices such as hard drives (e.g., magnetic, optical, or solid state drives), holographic storage devices, and other storage devices. Mass storages 512 and/or 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can be used to provide access to other subsystems and devices as well. As shown, these can include a display 518, a network interface 516, an input/output (I/O) device interface 504, an image processing device 506, as well as other subsystems and devices. For example, image processing device 506 can include a camera, a scanner, etc.; I/O device interface 504 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 500. Multiple I/O device interfaces can be used in conjunction with computer system 500. The I/O device interface can include general and customized interfaces that allow the processor 502 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 516 allows processor 502 to be coupled to another computer, computer network, or telecommunications network using a network connection as shown. For example, through the network interface 516, the processor 502 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 5 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 504 and display 518 share the touch sensitive screen component, which both detects user inputs and displays outputs to the user). In addition, bus 514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a mesh layer including a plurality of light emitting diodes (LEDs), wherein:
    at least a subset of the LEDs is selectively controllable to control lighting of the mesh layer; and
    the subset of the LEDs emits light visible to a human eye;
    a screen layer at least partially aligned with the mesh layer, wherein the screen layer is configured to: be illuminated from behind by the mesh layer, and at least partially absorb light projected onto the screen layer; and
    a projection controller configured to control a front projection;
    wherein the front projection comprises a plurality of projection layers;
    the system is configured to display a composite image; and
    in connection with the displaying the composite image, the projection controller controls the front projection in a manner that each of the plurality of projection layers is controlled to: (i) display a subset of the composite image that is different from subsets of the composite image displayed by other projection layers of the plurality of projection layers, or (ii) not display any subset of the composite image.

2. The system of claim 1, further comprising a mesh layer controller configured to control at least one of brightness and color of the mesh layer.

3. The system of claim 1, wherein the lighting of the mesh layer forms an image.

4. The system of claim 1, wherein the mesh layer includes a plurality of RGB LEDs.

5. The system of claim 1, wherein the mesh layer includes a first subset of LEDs associated with a first image element and a second subset of LEDs associated with a second image element.

6. The system of claim 1, wherein the screen layer is at least semi-translucent.

7. The system of claim 1, wherein the front projection includes a first layer associated with a sky, a second layer associated with an element, and a third layer associated with a character.

8. The system of claim 1, wherein the screen layer includes areas of varying thickness.

9. The system of claim 1, wherein the screen layer includes areas of varying light transmissibility.

10. The system of claim 1, wherein the screen layer includes areas of varying light reflectivity.

11. The system of claim 1, wherein the screen layer includes at least one cutout.

12. The system of claim 1, wherein the screen layer is at least partially fabric and adapted to conform to a surface.

13. The system of claim 1, further comprising a controller configured to: provide dynamic and selective control of LEDs included in the mesh layer; and provide the front projection.

14. The system of claim 13, wherein the controller is configured to coordinate the dynamic and selective control of LEDs included in the mesh layer and the front projection to produce a dynamic composite image.

15. The system of claim 14, wherein the controller is configured to produce a sequence of dynamic composite images.

16. The system of claim 1, wherein the screen layer is configured to comprise a subset of the composite image that is pre-printed onto the screen layer.

17. The system of claim 1, wherein:
    the system further comprises a mesh layer controller configured to control at least one of brightness and color of the mesh layer; and
    in connection with displaying the composite image, the mesh layer is controlled to provide shading for a plurality of subsets of the composite image; and
    the shading for a particular subset of the composite image is different from at least one other subset of the composite image.

18. A method, comprising:
    obtaining media to be displayed;
    determining control of a mesh layer associated with the obtained media, wherein the mesh layer includes a plurality of light emitting diodes (LEDs), at least a subset of the LEDs is selectively controllable to control lighting of the mesh layer, and the subset of the LEDs emits light visible to a human eye;
    outputting instructions to the mesh layer according to the determined control of the mesh layer;
    determining a projection associated with the obtained media;
    outputting instructions associated with the determined projection, wherein the instructions cause a front projection to be output to a screen layer at least partially aligned with the mesh layer, the screen layer being configured to be illuminated from behind by the mesh layer, and at least partially absorb light projected onto the screen layer;
    controlling the front projection with a projection controller, wherein the front projection comprises a plurality of projection layers; and
    displaying a composite image;
    wherein in connection with the displaying the composite image, the projection controller controls the front projection in a manner that each of the plurality of projection layers is controlled to: (i) display a subset of the composite image that is different from subsets of the composite image displayed by other projection layers of the plurality of projection layers, or (ii) not display any subset of the composite image.

19. The method of claim 18, further comprising coordinating timing of the outputting instructions to the mesh layer according to the determined control of the mesh layer and the outputting instructions associated with the determined projection such that the composite image is formed.

20. The method of claim 18, further comprising:
    controlling at least one of brightness and color of the mesh layer with a mesh layer controller, wherein:
    in connection with displaying the composite image, the mesh layer is controlled to provide shading for a plurality of subsets of the composite image; and
    the shading for a particular subset of the composite image is different from at least one other subset of the composite image.

21. A computer program product embodied in a non-transitory computer readable medium and comprising computer instructions for:
    obtaining media to be displayed;
    determining control of a mesh layer associated with the obtained media, wherein the mesh layer includes a plurality of light emitting diodes (LEDs) LEDs, at least a subset of the LEDs is selectively controllable to control lighting of the mesh layer, and the subset of the LEDs emits light visible to a human eye;
    outputting instructions to the mesh layer according to the determined control of the mesh layer;

determining a projection associated with the obtained media;

outputting instructions associated with the determined projection, wherein the instructions cause a front projection to be output to a screen layer at least partially aligned with the mesh layer, the screen layer being configured to be illuminated from behind by the mesh layer, and at least partially absorb light projected onto the screen layer;

controlling the front projection with a projection controller, wherein the front projection comprises a plurality of projection layers; and displaying a composite image;

wherein in connection with the displaying the composite image, the projection controller controls the front projection in a manner that each of the plurality of projection layers is controlled to: (i) display a subset of the composite image that is different from subsets of the composite image displayed by other projection layers of the plurality of projection layers, or (ii) not display any subset of the composite image.

22. The computer program product of claim 21, further comprising computer instructions for:

controlling at least one of brightness and color of the mesh layer with a mesh layer controller, wherein:

in connection with displaying the composite image, the mesh layer is controlled to provide shading for a plurality of subsets of the composite image; and the shading for a particular subset of the composite image is different from at least one other subset of the composite image.

23. A system comprising:

a mesh layer including a plurality of light emitting diodes (LEDs), wherein:

at least a subset of the LEDs is selectively controllable to control lighting of the mesh layer; and the subset of the LEDs emits light visible to a human eye;

a screen layer at least partially aligned with the mesh layer, wherein the screen layer is configured to: be illuminated from behind by the mesh layer, and at least partially absorb light projected onto the screen layer; and a projection controller configured to control a front projection, wherein the front projection includes a first layer associated with a sky, a second layer associated with an element, and a third layer associated with a character.

24. The system of claim 23, further comprising a mesh layer controller configured to control at least one of brightness and color of the mesh layer.

25. The system of claim 23, wherein the lighting of the mesh layer forms an image.

26. The system of claim 23, wherein the mesh layer includes a plurality of RGB LEDs.

27. The system of claim 23, wherein the mesh layer includes a first subset of LEDs associated with a first image element and a second subset of LEDs associated with a second image element.

28. The system of claim 23, wherein the screen layer includes areas of varying thickness.

29. The system of claim 23, wherein the screen layer includes areas of varying light transmissibility.

30. The system of claim 23, wherein the screen layer includes areas of varying light reflectivity.

31. The system of claim 23, wherein the screen layer includes at least one cutout.

32. The system of claim 23, wherein the screen layer is at least partially fabric and adapted to conform to a surface.

* * * * *